United States Patent [19]

Kamata

[11] Patent Number: 4,704,688

[45] Date of Patent: Nov. 3, 1987

[54] INTERPOLATION METHOD FOR NUMERICAL CONTROL MACHINE

[75] Inventor: Junichi Kamata, Aichi, Japan

[73] Assignee: Mitsubishi Denki Kabushiki Kaisha, Tokyo, Japan

[21] Appl. No.: 743,731

[22] Filed: Jun. 12, 1985

[30] Foreign Application Priority Data

Jun. 12, 1984 [JP] Japan .................................. 59-120447
Jun. 12, 1984 [JP] Japan .................................. 59-120448

[51] Int. Cl.$^4$ ...................... G06F 15/46; G05B 19/403
[52] U.S. Cl. ...................................... 364/474; 318/573
[58] Field of Search ............................. 364/167–171, 364/474, 475; 82/1 C, 2 B; 318/561, 571, 573, 567, 569, 570

[56] References Cited

U.S. PATENT DOCUMENTS

| 3,725,651 | 4/1973 | Cutler | 364/475 |
| 3,986,010 | 10/1976 | Lankford et al. | 364/474 |
| 4,027,245 | 5/1977 | Bourrat et al. | 364/474 |
| 4,250,551 | 2/1981 | Paveglio, Jr. et al. | 364/474 |
| 4,547,847 | 10/1985 | Olig et al. | 364/474 X |
| 4,565,474 | 1/1986 | Charles | 409/51 |
| 4,581,698 | 4/1986 | Jaswa | 364/169 |

Primary Examiner—Joseph Ruggiero
Attorney, Agent, or Firm—Sughrue, Mion, Zinn, Macpeak & Seas

[57] ABSTRACT

In machining a workpiece along a spiral line with a numerical control machine, an interpolation method is employed in which, in order to maintain the machining speed constant, the spiral line is divided into a number of segments, and a small movement in the direction of the rotational axis and a small movement in the linear axis direction are calculated for each of the segments.

4 Claims, 8 Drawing Figures

INTERPOLATION METHOD FOR NUMERICAL CONTROL MACHINE

BACKGROUND OF THE INVENTION

The present invention relates to an interpolation method for a numerical control machine.

When a workpiece is machined spirally with a numerical control machine, that is, when it is machined along a spiral segment which, as shown in FIG. 3, has a start point $S_0$ on a straight axis X passing through the center 0 of a rotational axis and a finish point $S_F$ shifted by a pitch P in the X-axis direction every revolution, linear interpolation should be effected along the X-axis and the C-axis simultaneously. In this case, the machining speed v is:

$$v = \omega \cdot r, \quad (1)$$

where $\omega$ is the angular speed around the C-axis and r is the radius.

The machining speed v should be constant. However, in practice, since it is required that the angular speed $\omega$ be constant, the machining speed v increases as the radius r increases. This means that the method is employable only in the case where the difference between the radii of the start point $S_0$ and the finish point $S_F$ of the spiral segment is not large. Therefore, when, in the case where the difference between the radii of the start point and the finish point of a spiral segment is relatively large and a uniform cutting operation is required, a method should be employed whereby the spiral segment is divided into a plurality of blocks $\widehat{S_0S_1}$, $\widehat{S_1S_2}$, ... and $\widehat{S_{n-1}S_n}$ so that the machining speed is not high. The machining operation is carried out with these blocks subjects to X-axis and C-axis simultaneous linear interpolation.

In order to machine a workpiece along the blocks $\widehat{S_0S_1}$ and $\widehat{S_1S_2}$ at a speed $v_c$, machining instructions should be issued so that anuglar speeds $v_c/r_0$ and $v_c/r_1$ are used for the blocks $\widehat{S_0S_1}$ and $\widehat{S_1S_2}$, respectively, where $r_0$ is the radius of the point $S_0$ of the block $\widehat{S_0S_1}$ and $r_1$ is the radius of the point $S_1$ of the block $\widehat{S_1S_2}$. That is, it is necessary to slightly change the speed around the C-axis for every block.

Thus, the conventional interpolation method is disadvantageous in that it is difficult to maintain the machining speed constant, with the result that the program for interpolation is considerably complex.

SUMMARY OF THE INVENTION

Accordingly, an object of the invention is to provide an interpolation method for a numerical control machine with which a spiral machining operation can be performed at a uniform speed.

In accordance with these and other objects of the invention, there is provided an interpolation method for a numerical control machine which is used to machine a workpiece along a spiral segment which changes with a predetermined pitch in the direction of a linear axis perpendicular to a rotational axis, including the steps of: setting desired values of a start point $S_0$, a finish point $S_F$ and a pitch P of the spiral segment, and a machining speed $v_c$; dividing, in accordance with the desired values, the spiral segment into a plurality of short segments each of which is used for machining in a short time interval $\Delta T$, and calculating a linear axis coordinate $r_0$ of a start point of each of the short segments; and calculating, according to the linear axis coordinate, the machining speed $v_c$ and the time interval $\Delta T$, a small amount of rotation $\Delta \theta$ around the rotational axis, and a small movement $\Delta r$ in the direction of the linear axis. The small amount of rotation $\Delta \theta$ and the small amount of movement $\Delta r$ are employed for simultaneous linear interpolation.

DESCRIPTION OF THE PREFERRED EMBODIMENTS

Figure 1:
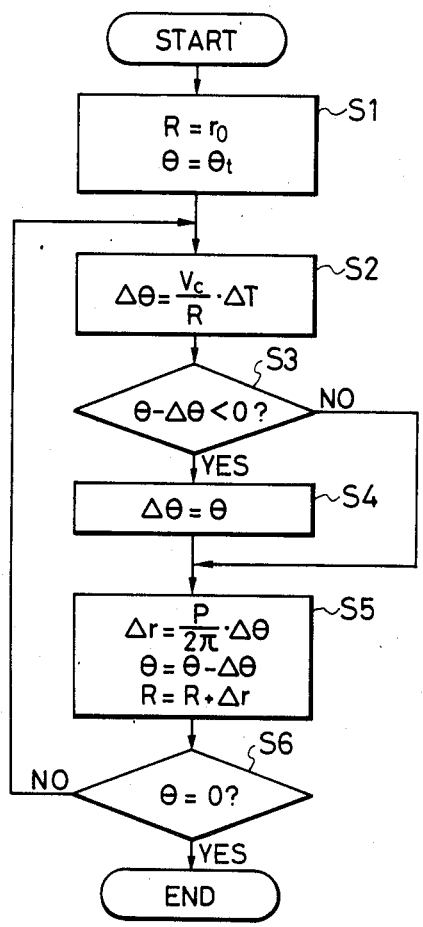
FIG. 1 is a flow chart used for a description of the operation of a first embodiment of the invention in which a microcomputer is employed.
Figure 2:
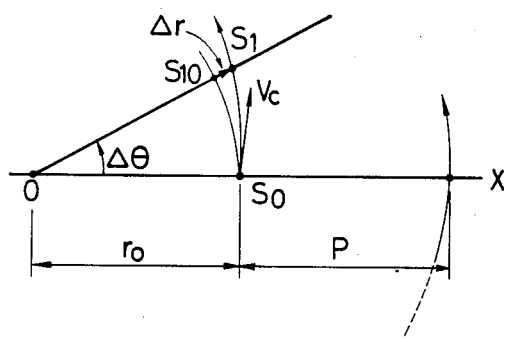
FIG. 2 is an explanatory diagram used for a description of the operating principles of the first embodiment.
Figure 3:
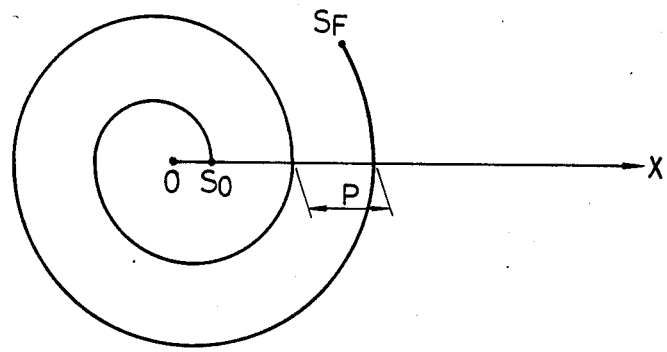
FIGS. 3 and 4 are explanatory diagrams used for descriptions of conventional interpolation methods.
Figure 4:
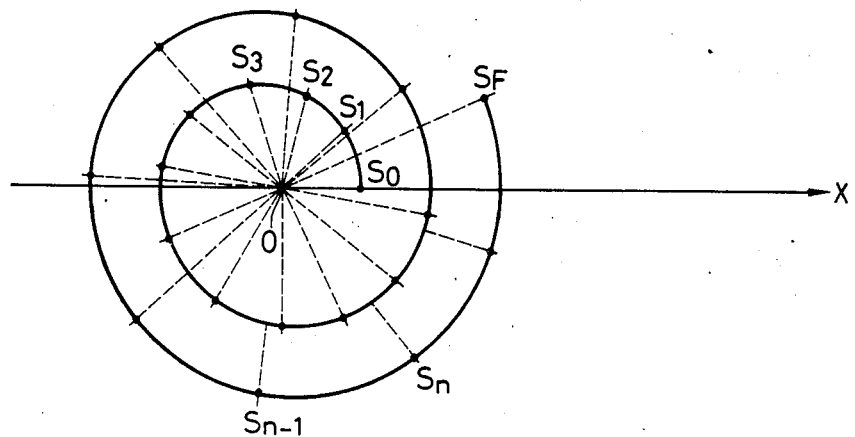

FIG. 1 is a flow chart used for a description of the operation of a first embodiment of the invention which utilizes a microcomputer, and FIG. 2 is an explanatory diagram for a description of the principles of the first embodiment.

In FIG. 2, a short segment $\widehat{S_0S_1}$ is one of plural short segments obtained by dividing a spiral segment into a plurality of parts. In order to machine the workpiece along the short segment $\widehat{S_0S_1}$ in a short time $\Delta T$, the C-axis and the X-axis should be linearly interpolated in steps of $\Delta \theta$ and $\Delta r$ simultaneously in the interval of $\Delta T$. In this connection, it can be considered that, if the time $\Delta T$ is decreased to a considerably small value, in other words, if $\Delta \theta$ and $\Delta r$ are sufficiently small, then the configuration obtained through the interpolation process is approximately equal to the short segment $\widehat{S_0S_1}$.

On the other hand, for interpolation with a radius $r_0$ of the start point $S_0$ of a short segment $\widehat{S_0S_1}$, a pitch P, and a machining speed $v_c$, the amounts of movement $\Delta r$ and $\Delta \theta$ along the X-axis and around the C-axis are obtained as follows:

It is assumed that a line connecting the start point $S_0$ of the segment $\widehat{S_0S_1}$ and the center 0, and a circle with its center at 0 which passes through the point $S_0$ intersect each other at a point $S_{10}$. Then, if $\Delta \theta$ is small, $$\widehat{S_0S_1} \approx \widehat{S_0S_{10}} \quad (2)$$

$$\widehat{S_0S_{10}} = \Delta \theta r_0 \quad (3)$$

$$v_c = \widehat{S_0S_1}/\Delta T. \quad (4)$$

Therefore, $\Delta \theta$ can be represented by the following equation:

$$\Delta \theta = \frac{1}{r_0} \widehat{S_0S_{10}} \approx \frac{1}{r_0} \widehat{S_0S_1} = \frac{1}{r_0} v_c \Delta T. \quad (5)$$

For a spiral segment having a pitch P, the radius changes by P every revolution; that is, the radius changes gradually. Therefore, if the angle of rotation is $\Delta\theta$, the variation $\Delta r$ of the radius is:

$$\Delta r = \frac{\Delta\theta}{2\pi} P. \tag{6}$$

Accordingly, the amounts of movements in the C-axis and X-axis are changed by $\Delta\theta$ and $\Delta r$, respectively, in the time interval $\Delta T$, as obtained from expressions (5) and (6), respectively.

FIG. 1 indicates an example of a method for repeatedly interpolating the small variations $\Delta\theta$ and $\Delta r$. In Step S1, the X-axis coordinate $r_0$ of the start point $S_{n-1}$ of a short segment $\widehat{S_{n-1}S_n}$ is inputted to a register R, and the rotational angle $\theta_t$ is inputted to a register $\theta$.

For interpolation of the spiral segment, in addition to the above-described data, a machining speed $v_c$ and a pitch P are instructed, and in Step S2, $\Delta\theta$ is calculated. When the radius of the finish point is larger than that of the start point, the pitch P is determined as being positive (P>0), and when the radius of the finish point is smaller than that of the start point, the pitch P is determined as being negative (P<0). Therefore, in Step S3, it is determined whether P is positive or negative. In Step S5, $\Delta r$ is calculated. $\Delta T$ is the fixed interpolation period, and $\Delta\theta$ and $\Delta r$ are calculated as interpolation outputs every $\Delta T$ interval. The abovedescribed operations are repeatedly carried out until $\theta=0$ is obtained. Thus, a uniform machining operation is achieved along the spiral segment.

As is apparent from the above-described embodiment, a spiral segment is divided into a number of short segments along which the workpiece is to be machined in corresponding short time intervals $\Delta T$, and for each of the short segments, small movements in the rotational-axis and the linear-axis directions are calculated by interpolation. Therefore, a simple program permits the uniform machining of a workpiece along a spiral segment.

A second embodiment of the invention will now be described in which a variable pitch is employed.

Figure 7:
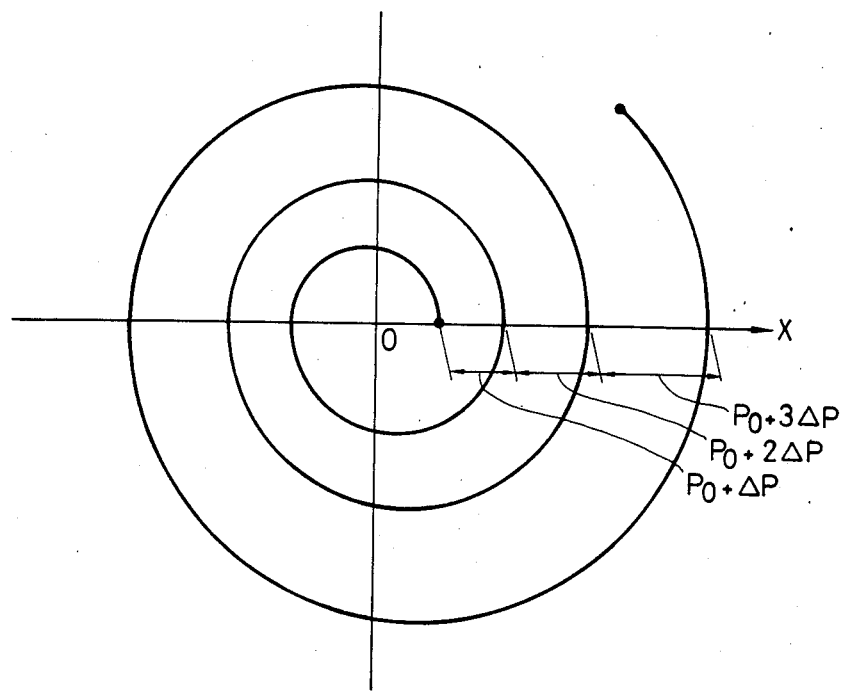
FIGS. 7 and 8 are explanatory diagrams used for a description of a variable-pitch spiral line and its interpolation.

When a workpiece is machined along a spiral segment having a variable pitch with a numerical control machine, that is, when it is machined along a spiral segment S which, as shown in FIG. 7, has a start point on a linear axis X passing through the center 0 of a rotational axis C and a radius which changes by P every revolution, simultaneous linear interpolation is carried out in the X-axis and C-axis directions, whereby the spiral segment S is divided into a number of small blocks, and for each block, the X-axis and the C-axis are incremented by $\Delta r$ and $\Delta\theta$, respectively, in a fixed interpolation time $\Delta T$.

Figure 8:
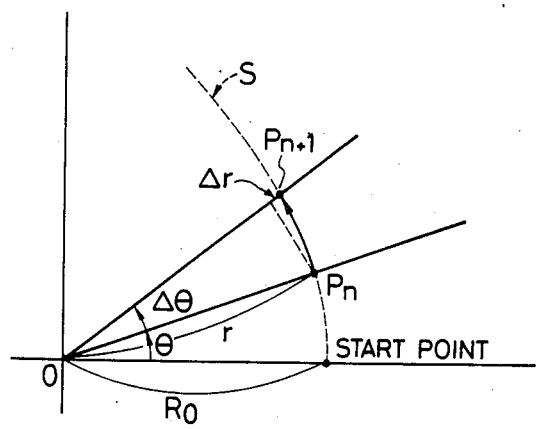

FIG. 8 shows the start point of a spiral segment S of this type. The radius r of any point $P_n$ on the segment S is a function of the angle $\theta$ and can be represented by the following expression:

$$\Delta r = R_0 + P_0 \frac{\theta}{2\pi} + \Delta P \frac{\theta(\theta + 2\pi)}{8\pi^2}, \tag{7}$$

where $R_0$ is the radius of the start point of the spiral segment S, $P_0$ is the pitch constant, $\Delta P$ is the pitch variation rate, and $\theta$ is the angle of rotation in the case where the start point is the origin point of the C axis.

In order to machine the workpiece along a part between points $P_n$ and $P_{n+1}$ on the spiral segment S as shown in FIG. 8, the following approximation is calculated in which $r_n$ is the radius of the point $P_n$:

$$r_n \Delta\theta \simeq \widehat{P_n P_{n+1}}. \tag{8}$$

Then, the following equation is evaluated:

$$v\Delta T = \widehat{P_n P_{n+1}} \simeq r_n \Delta\theta. \tag{9}$$

The small variation $\Delta\theta$ in the direction of the rotational axis can be obtained from equation (9) as follows:

$$\Delta\theta = \frac{v \cdot \Delta T}{r_n}. \tag{10}$$

The radius $r_{n+1}$ of the point $P_{n+1}$ can be obtained from equation (7) as:

$$r_{n+1} = R_0 + P_0 \frac{\theta + \Delta\theta}{2\pi} + \Delta P \frac{(\theta + \Delta\theta)(\theta + \Delta\theta + 2\pi)}{8\pi^2}. \tag{11}$$

Therefore, the small movement R in the linear axis direction is:

$$\Delta r = r_{n+1} - r_n \tag{12}$$

If interpolation in the C-axis and the X-axis directions is carried out with the value $\Delta\theta$ calculated according to expression (10) and the value $\Delta r$ calculated according to expression (12), the workpiece can be machined along the part $\widehat{P_n P_{n+1}}$ of the spiral segment S.

In the above-described method, the calculations of expressions (9) through (12) are repeatedly carried out for a number of short segments to machine the workpiece along the spiral segment. Accordingly, the resultant program is somewhat complex.

Figure 5:
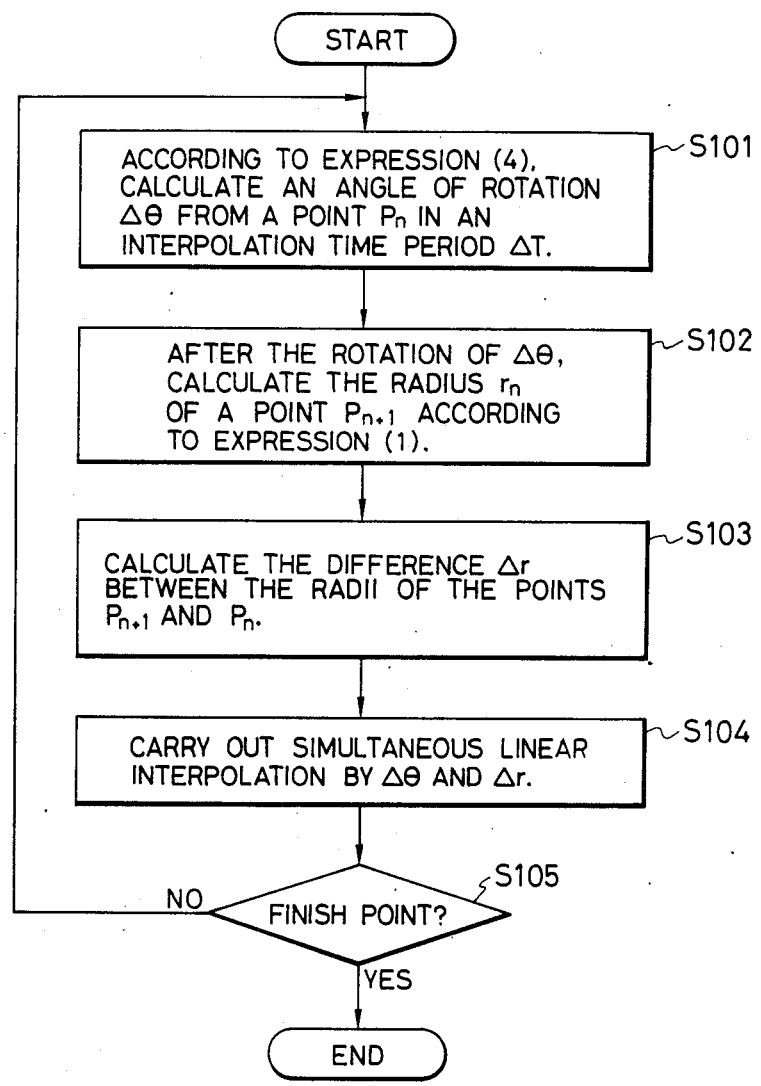
FIG. 5 is a flow chart used for a description of essential steps of the operations of a second embodiment of the invention.

On the other hand, by using the following method, a simple program can be used to machine a workpiece along a variable-pitch spiral line. In this method, the radius $R_0$ of the start point of a variable-pitch spiral segment, the rotational angle $\theta_G$ of the finish point, the pitch variation constant $\Delta P$, and the machining speed v, as viewed from the rotational axis and the linear axis passing through the rotational axis are determined. Then, as shown in FIG. 5, by using the values thus determined, an angle of rotation $\Delta\theta$ from a point $P_n$ (n=0, 1, . . . ) in an interpolation time period $\Delta T$ is obtained, the radius $r_n$ of a point $P_{n+1}$ which is located at the angle of rotation $\Delta\theta$ from the point $P_n$ is obtained, and the difference $\Delta r$ between the radii of the points $P_{n+1}$ and $P_n$ is obtained.

Figure 6:
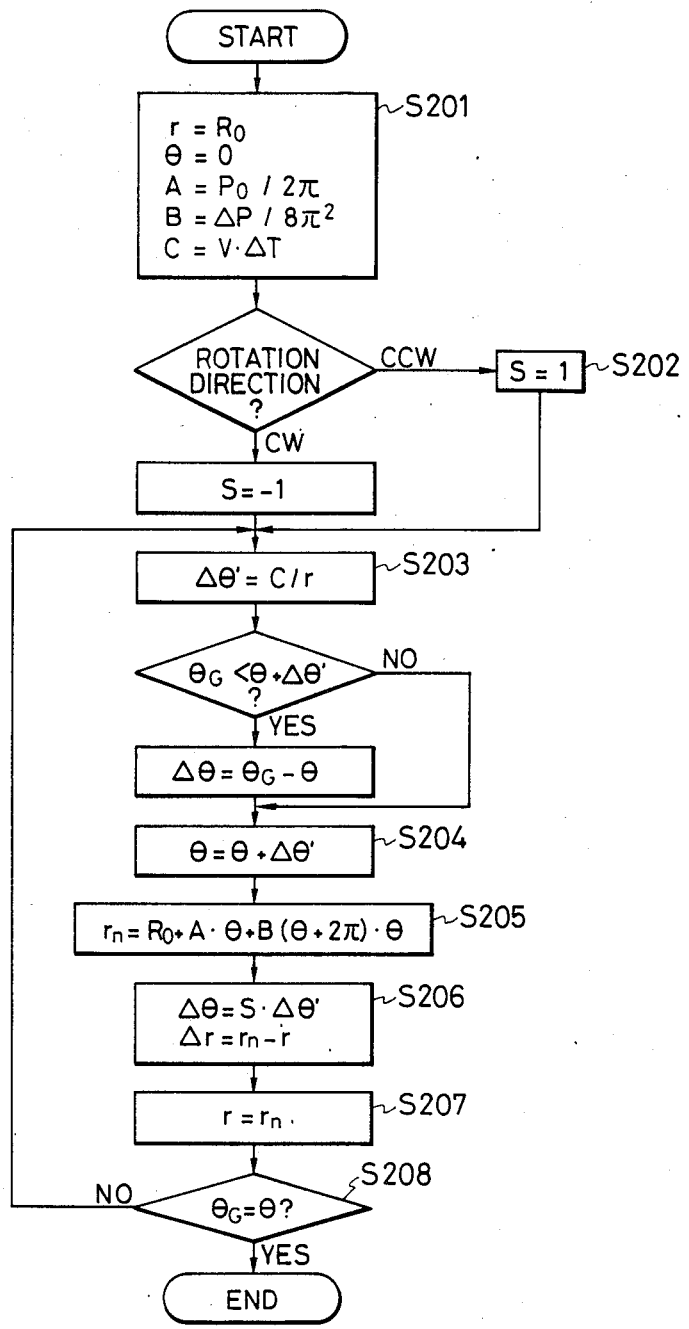
FIG. 6 is also a flow chart used for a description of the operations of the second embodiment in which a microcomputer is used.

FIG. 6 is a flow chart used for a description of the operations of the above-described embodiment in which a microcomputer is utilized.

In this case, the radius $R_0$ of the start point of a variable-pitch spiral segment, the angle of rotation $\theta_G$ of the finish point, the pitch constant $P_0$, the pitch variation constant $\Delta P$, and the machining speed v are given as interpolation parameters. The term "pitch variation constant" is intended to mean the variation of the pitch. That is, $\Delta P$ is added to the pitch constant $P_0$ every revolution. The rotational angle $\theta$ is positive at all times, and the rotational angle $\theta$ of the start point is zero ($\theta=0$). Accordingly, the total rotational angle is equal to $\theta_G$.

In Step S201, an initial calculation is carried out. In Step S201, reference character r designates a register into which the radius value of a point $P_n$ is inputted, and $\theta$ designates a register into which the rotational angle of the point $P_n$ is inputted; their initial values are $R_0$ and 0 (zero), respectively. A, B and C are constants which are employed to simplify calculations which are carried out later. In Step S202, S is a code used for determining the direction of rotation. In Step S203, the amount of rotation around the C-axis for one interpolation is obtained. Then, in Step S204, the rotational angle $\theta$ of a point $P_{n+1}$ located through interpolation is obtained.

In Step S204, the radius of the point $P_{n+1}$ is obtained. In Step S206, the interpolation output data $\Delta\theta$ of the C-axis and the interpolation output data $\Delta r$ of the X-axis are obtained and linear interpolation in the two axes is effected simultaneously for the point $P_{n+1}$.

In Step S207, the content of the radius value register r is renewed. The rotational angle of the present point $P_{n+1}$ is inputted to the rotational angle register $\theta$. When the rotational angle thus inputted coincides with the angle of the finish point, interpolation is ended. If not, interpolation calculation is carried out again beginning from Step S203.

Thus, the variable-pitch spiral segment can be interpolated for the uniform-speed machining operation.

As is apparent from the above-described embodiment, merely by determining several parameters, a simple program can be used to machine a workpiece along a pitch-variable spiral line at a uniform speed.

I claim:

1. An interpolation method for a numerical control machine which is used to machine a workpiece along a spiral segment which changes with a predetermined pitch in the direction of a linear axis perpendicular to a rotational axis, comprising the steps of:

setting desired values for a start point $S_0$, a finish point $S_F$ and a pitch P of said spiral segment, and a machining speed $v_c$;

dividing, according to said desired values, said spiral segment into a plurality of short segments each of which is used for machining in a short time $\Delta T$, and calculating a linear axis coordinate $r_0$ of a start point of each of said short segments; and calculating, according to said linear axis coordinate $r_0$, machining speed $v_c$, and short time $\Delta T$, a small amount of rotation $\Delta\theta$ around said rotational axis and a small movement $\Delta r$ in a direction of said linear axis, said small amount of rotation $\Delta\theta$ and said small movement $\Delta r$ being employed for simultaneous linear interpolation.

2. The method as claimed in claim 1, wherein said short time $\Delta T$ is a fixed period for repeatedly carrying out an interpolation calculation, and said small amount of rotation $\Delta\theta$ and small movement $\Delta r$ are calculated every short time $\Delta T$.

3. An interpolation method for a numerical control machine which is used to machine a workpiece along a variable-pitch spiral segment whose pitch changes at a predetermined rate in the direction of a linear axis perpendicular to a rotational axis, comprising the steps of:

setting desired values for a radius $R_0$ of a start point, a rotational angle $\theta_G$ of a finish point, a pitch constant $P_0$ and a pitch variation constant $\Delta P$ of said spiral segment, and a machining speed v;

obtaining, according to said desired values, an amount of rotation $\Delta\theta$ for machining said workpiece from a point $P_n$ on said spiral segment in a short time $\Delta T$;

obtaining a radius $r_n$ of a point $P_{n+1}$ located relative to said point $P_n$ through rotation $\Delta\theta$; and obtaining a difference $\Delta r$ between radii of said points $P_{n+1}$ and $P_n$, said data $\Delta\theta$ and $\Delta r$ thus obtained being employed for simultaneous linear interpolation.

4. The method as claimed in claim 3, wherein said pitch changes in such a manner that said pitch variation constant $\Delta P$ is added to said pitch constant $P_0$ every turn of said spiral segment.

* * * * *